Aug. 30, 1966  J. E. ANDERSON  3,269,179
NAVIGATIONAL INSTRUMENTS

Filed May 29, 1959  6 Sheets-Sheet 1

INVENTOR
JOHN EDWARD ANDERSON
BY Roger W. Jensen
ATTORNEY

Aug. 30, 1966   J. E. ANDERSON   3,269,179
NAVIGATIONAL INSTRUMENTS
Filed May 29, 1959   6 Sheets-Sheet 3

INVENTOR
JOHN EDWARD ANDERSON
BY Roger W. Jensen
ATTORNEY

United States Patent Office 3,269,179
Patented August 30, 1966

3,269,179
NAVIGATIONAL INSTRUMENTS
John E. Anderson, Minneapolis, Minn., assignor to Minneapolis-Honeywell Regulator Company, Minneapolis, Minn., a corporation of Delaware
Filed May 29, 1959, Ser. No. 816,959
4 Claims. (Cl. 33—178)

This invention relates to the field of navigational instruments and more particularly to an inertial to be used with a dirigible craft and which is gimballess in the sense that the system as an entirety is not gimbal mounted but is fixedly mounted in the craft.

Inertial navigation of a vehicle requires knowledge of the relative acceleration of the vehicle with respect to a navigational coordinate system. In current gimballed inertial systems, this knowledge is obtained from accelerometers mounted upon a platform which is isolated from vehicle motion by means of gimbals. The platform is aligned, and gyro stabilized, to remain angularly fixed with respect to the navigational coordinate system. Relative acceleration is derived in a computer by subtracting from the accelerometer outputs, the acceleration due to gravitational mass attraction and the effect of rotation of the navigational coordinate system with respect to inertial space. Double integration of relative acceleration then gives position in terms of the chosen navigational coordinates.

It is well known that it is not actually necessary to maintain the accelerometers in alignment with the navigational coordinate system, but that they could remain fixed in the vehicle and their outputs transformed into components along the navigational coordinate axes. The transformation matrix, which replaced the isolation gimbals, must be derived in a computer from knowledge of the angular velocity of the vehicle with respect to the navigational coordinate system. Elimination of the isolation gimbals is desirable since it can reduce size, weight, and complexity of inertial systems and will eliminate the gimbal-flip problem.

In gimballess analytic systems, a coordinate transformation, as well as position computations, are performed in a computer. The most serious problem in a gimballess inertial system is the effect of the angular motion of the vehicle on the readings of the inertial instruments. Analysis of the instrument errors due to angular motion shows that these errors will be considerably reduced if the individual instrument is continuously rotated about its input axis. The main feature of this invention is that it shows how the rotation concept can be incorporated into the inertial instruments individually without sacrificing the overall advantages of the gimballess inertial system.

One approach to solving the problem is to use six pendulous gyro accelerometers, in such a manner that the turntable in each pendulous gyro accelerometer will be in continuous rotation with respect to the vehicle. This continuous rotation is caused by the input force of acceleration being present along a rotational axis of a turntable contained within each pendulous gyro accelerometer. This relative rotation causes cancellation of many of the important gyro errors in a way not possible if the gyro is not allowed to rotate. Cancellation of these important gyro errors in not possible in a gimballed type system.

A second embodiment of the invention solves the problem by using single axis platforms comprising in part single axis integration gyros, in combination with pendulous gyro accelerometers. A single axis platform mounts a single axis integrating gyro on a turntable for rotation about a rotational axis which is aligned with, or parallel to the gyro input axis. As the turntable rotates in space about the instantaneous rotational axis of the craft, the gyro senses the component of rotation about its own input axis which is the turntable axis, precesses about its output axis and generates a signal as a function of its precession. The signal produced is applied to the servo motor or other means controlling the turntable and the turntable is rotated in a direction about the rotational axis thereof so as to substantially maintain it and the gyro at their original position. As the gyro is returned to its original position about its input axis, it precesses back to its original non-signal producing or null position.

In order to use a single-axis platform to solve the problem, a constant torque is applied to the turntable to cause the turntable to rotate constantly so that the drift due to cross coupling accelerations and angular velocities are substantially reduced; while the important gyro errors are reduced in the same manner as in the embodiment of the invention which employs six pendulous gyro accelerometers. This scheme has the advantage that a misalignment correction is eliminated, where the input axes of the pendulous gyro accelerometer and single axis platform are not exactly parallel. This will be explained in more detail later.

It is therefore a general object of the present invention to provide an improved inertial navigation sensor.

A further object of the present invention is to provide a gimballess inertial navigation system wherein the errors generally associated with gyros are substantially eliminated.

It is still another object of the invention to provide a gimballess system whereby instruments provide output signals which can be separated into components of velocity and angular position.

It is yet another object of the present invention to provide a gimballess inertial system utilizing single axis platforms and pendulous gyro accelerometers.

It is still a further object of the present invention to provide a gimballess inertial system utilizing pendulous gyro accelerometers only.

It is a further object of the present invention to provide a gimballess inertial system in combination with a computer for separating signals from the system into components.

It is another object of the present invention to provide a gimballess system wherein the input axes of the inertial instruments form approximately equal angles with the thrust vector of the vehicle.

It is yet another object of the present invention to provide a gimballess system wherein the input axes of the instruments mounted thereon substantially intersect.

These and other features will become more apparent from the following detailed description and accompanying drawings in which.

Figure 2:
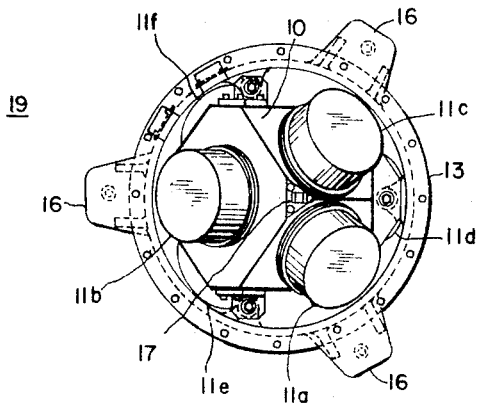
FIGURE 2 is a top view of the gimballess system showing the relative position of the inertial instruments.
Figure 1:
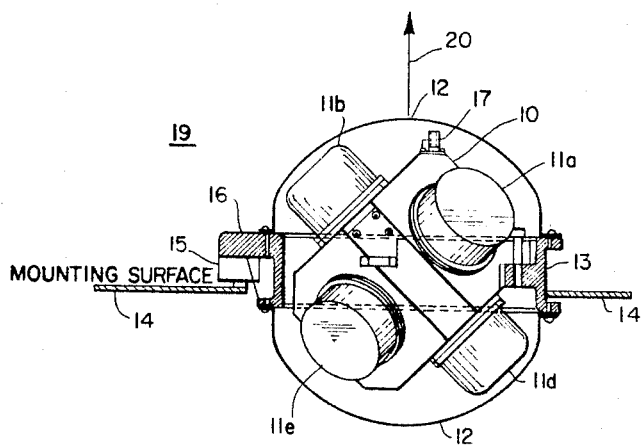
FIGURE 1 is a side view of the gimballess system showing the relative positions of the inertial instruments.
Figure 5:
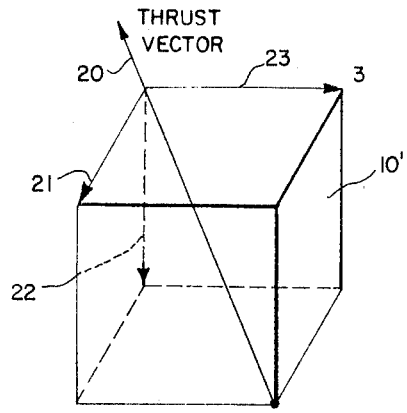
FIGURE 5 is a three dimensional diagram showing the relative position of the input axes and thrust vector.

In FIGURE 1 a gimballess inertial system 19 comprises a rectangular block or cube 10 which supports a plurality of inertial instruments 11a, 11b, 11c (which is hidden from view) 11d, 11e, and 11f (not visible). These same elements are shown in FIGURE 2 from a top view. As will be explained later, certain of the inertial instruments 11a through 11f may be either a single axis platform or a pendulous gyro accelerometer. A housing 12 encompasses the mounting block 10 and the inertial instruments. An outer frame 13 is mounted on a mounting surface 14 which generally is a part of the vehicle, by a vibration isolator 15. Vibration isolator 15 may be of the general "shock mounting" type and may vary in its relative stiffness. Outer frame member 13 is secured to vibration isolator 15 through suitable mounting lugs 16. Also provided at the top of mounting block 10 is an optical mirror 17. Optical mirror 17 is provided so that a proper azimuth alignment may be made whereby signals can be created to provide a computer with a proper reference. As shown, a thrust vector or normal force vector would lie along a line parallel to one directly out of the optical mirror 17 as found in FIGURE 2. This is better shown in FIGURE 5 in which thrust vector 20 is shown projected through the intersection of input axes 21, 22, and 23 which are shown as forming three edges of the cube or rectangular block 10'.

Figure 4:
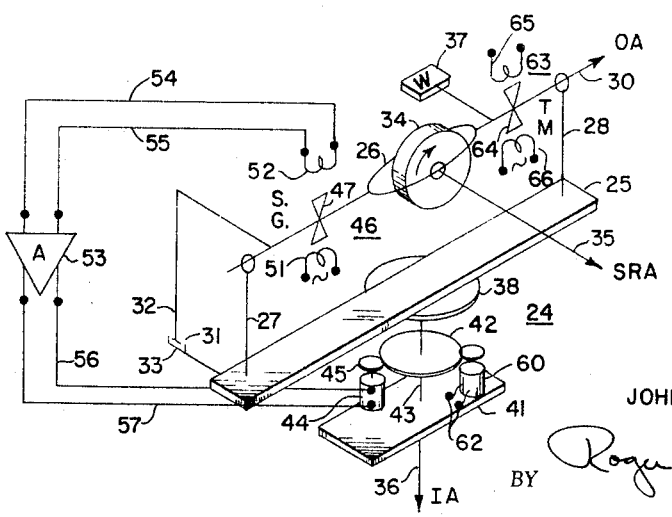
FIGURE 4 is a schematic representation of a pendulous gyro accelerometer.

Referring to FIGURE 4, reference numeral 24 designates a pendulous gyro accelerometer. The pendulous gyro accelerometer includes a gyro case 25 and a gimbal assembly 26. The support for the gimbal assembly 26 to facilitate rotation relative to the gyro case 25 about an output axis is schematically shown by a pair of supports 27 and 28 which define a pivotal or output axis (OA) 30. Gimbal assembly 26 has suitable extensions which are supported by supports 27 and 28. It will be understood generally that in the usual case the pendulous gyro accelerometer per se will be floated in a damping fluid and this teaching is set forth in the Jarosh et al. Patent 2,802,956 which issued August 13, 1957. The inherent viscous damping produced by floating gimbal assembly 26 with respect to case 25 is schematically represented by a damper 31 including a movable member 32 connected to the gimbal assembly, and a fixed member 33 which is connected to gyro case 25. Gimbal assembly 26 further includes a rotor element 34 adapted for rotation with respect to the gimbal assembly 26 about a spin axis the null or datum position of which with respect to the gyro case 25 is designated as the spin reference axis (SRA) 35. It will be understood that suitable means are provided for journaling the rotor element 34 with respect to gimbal assembly 26 and that suitable means are provided for rotating rotor 34. Spin reference axis 35 is perpendicular to output axis 30. There is also a gyro input axis (IA) which is perpendicular to both the output axis 30 and the spin reference axis 35. This is identified by reference numeral 36. It is understood by those skilled in the art that movement of gyro case 25 about input axis 36 will cause a precession of the gimbal assembly 26 about output axis 30. Gimbal assembly 26 is made pendulous by the addition of a suitable mass W identified by reference numeral 37 which is mounted eccentrically on the gimbal assembly and is so positioned that its pendulosity vector is either aligned with or parallel to the spin reference axis 35. In FIGURE 4, the pendulous element is shown parallel with the spin reference axis 35 but it will be understood that in the usual apparatus the pendulous weight 37 is so related to the gimbal assembly that the pendulosity vector is aligned with the spin reference axis 35. Whether the pendulosity vector is aligned with or parallel to the spin reference axis 35 is not critical; however, it is important that the pendulosity vector be perpendicular to the gyro input axis 36. With the pendulous element 37 arranged as shown in FIGURE 4, the gimbal assembly becomes sensitive to acceleration along the gyro input axis 36. Thus the gyro input axis 36 also becomes the acceleration sensitive axis, or normal acceleration input axis for the component.

Gyro case 25 is mounted on a suitable turntable device 38 and the turntable is mounted for rotation about a turntable axis which pivots on a base 41. The turntable axis is provided by means of a gear train element 42 positioned on a shaft 43. Shaft 43 is rotatably supported by the base 41 and is fixedly connected to turntable 38. The axis is arranged so that the turntable axis is either parallel to or aligned with the gyro input axis 36. In FIGURE 4, the turntable axis is shown aligned with the gyro input axis 36. A servo motor 44 is operably connected between the base 41 and the turntable 38. As shown, motor 44 is mounted on base 41 and includes a pinion gear 45 adapted to mesh and rotate with gear train element 42. For some embodiments, servo motor 44 may be mounted directly on the turntable and would rotate therewith. It will be understood that whenever motor 44 is energized, it will cause relative rotation between turntable 38 and base 41.

Figure 7:
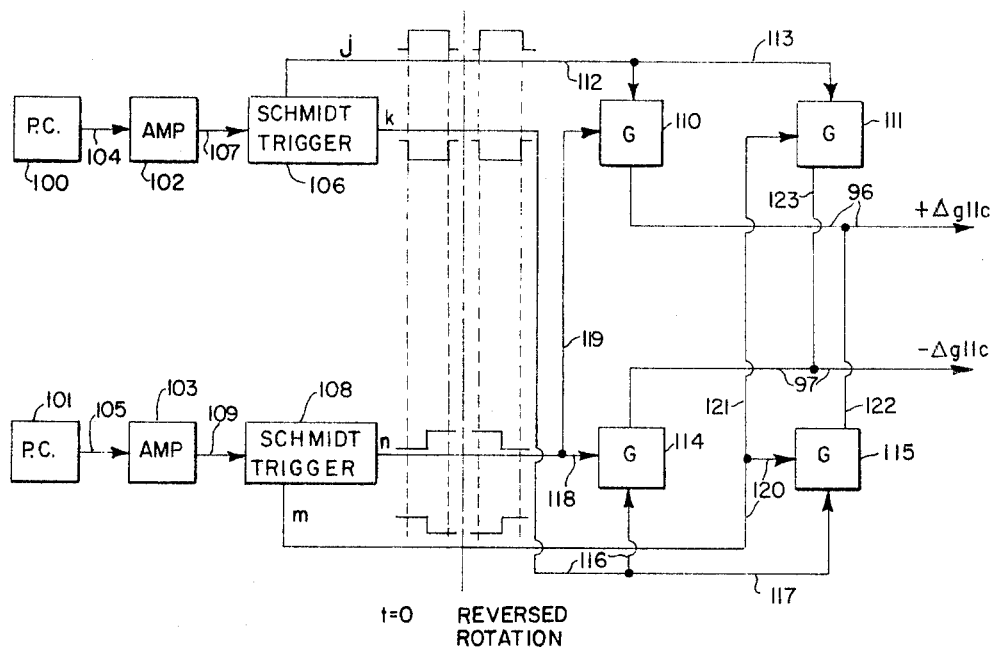
FIGURE 7 is a block diagram of a digital error pick-off or analog to digital converter to be used with the pendulous gyro accelerometers and single axis platforms.

Means are also provided in this apparatus for producing a signal representative of movement or rotation of gimbal assembly 26 about the ouput axis 30. This signal producing or signal generating means is identified by reference numeral 46 and includes a rotor element 47 connected to gimbal assembly 26, and a pair of windings 51 and 52. Winding 51 schematically represents an excitation winding which is energizable by a suitable source of alternating current and winding 52 schematically represents an output winding adapted to have induced therein an alternating signal of variable phase and magnitude indicative respectively of the sense and magnitude of rotation of gimbal assembly 26 about the output axis 30. Any suitable type of signal producing means may be used and the invention is not limited to any particular device. A suitable type of signal producing means is shown in the Mueller Patent 2,488,734, issued November 22, 1949. Output winding 52 of signal generator means 46 is connected to an amplifier 53 by a pair of suitable connecting means 54 and 55. Amplifier 53 is further connected to motor 44 through a pair of connecting leads 56 and 57. In the normal preferred mode of operation just described, rotor element 47 of signal generator 46 produces a signal upon rotation of gimbal element 26 thereby causing a signal to be sent to amplifier 53 where the signal is amplified and is used to cause motor 44 to rotate. Since the signal is of a certain phase and magnitude, motor 44 will cause turn table 38 to rotate relative to base 41, and because the gyro is fixedly mounted on turn table 38, it follows that the gyro is rotated also. Where the gyro input axis is oriented parallel with or colinear with the turn table axis, any rotation of the turn table relative to the base constitutes a rotation of the gyro about its input axis. The gyro will be rotated about its input axis in a direction so that the gimbal assembly will be precessed about its output axis 30, in a direction so as to return the gimbal towards its initial position. Any transient acceleration, vibration acceleration, and any constant or steady state acceleration acting on pendulous mass 37 will develop a certain torque acting to rotate gimbal assembly 26 about the output axis 30. Signal generating means 46 causes the servo motor to rotate turn table 38 at a rate and in the proper direction to develop a processional torque acting on gimbal assembly 26 that is equal and opposite to the torque produced by the initial acceleration. Under steady state acceleration conditions, or where the acceleration remains constant, the turn table will be rotating at a constant rate which will exactly cancel out or oppose the torque caused by the input acceleration. In other words, the velocity of rotation of the turn table is a measure of acceleration and therefore, the amount of turn table rotation or angular displacement is the integral of linear acceleration or the linear velocity of the device upon which the accelerometer is mounted. Suitable means are provided for measuring the magnitude of turn table angular displacement and in FIGURE 4 this is shown as a turn table pick-off 60 which is suitably coupled to gear train element 42 and which further comprises a pair of output terminals 62 which are adapted to be connected to suitable means such as that shown in FIGURE 8 which will be described in more detail later. Pick-off means 60 is schematically shown and may be a digital pick-off device such as is shown in the co-pending application of Vernon H. Aske and Arthur D. Glick, filed November 19, 1958, serial number 774,-952, now Patent No. 3,041,883, and assigned to the same assignee as the present application. The exact details of the pick-off form no part of the present invention and accordingly are not shown. When a digital pick-off is used such as that described in the copending application of Aske and Glick, a circuit such as that found in FIGURE 7 would be used to detect the rotation of turn table 38 and this circuit will be described later in the specification.

A torque motor 63 is provided to rotate gimbal assembly 26 about the output axis 30 without utilizing gyroscopic precessional forces. Torque motor 63 comprises a rotor element 64 which is attached to gimbal assembly 26, and a control winding 65 and an excitation winding 66. Torque motor 63 may also be of the type shown in the Mueller patent. Excitation winding 66 is excited by a suitable source of alternating current and control winding 65 is adapted to be energized by a signal of variable phase and magnitude to cause rotation of gimbal assembly 26 about output axis 30. Torque motor 63 can also be used to introduce command signals to precess gimbal assembly 26. It will be seen later that torque motor 63 is not needed in the six PGA embodiments of the invention, but is used with the embodiment employing single axis platforms.

Figure 3:
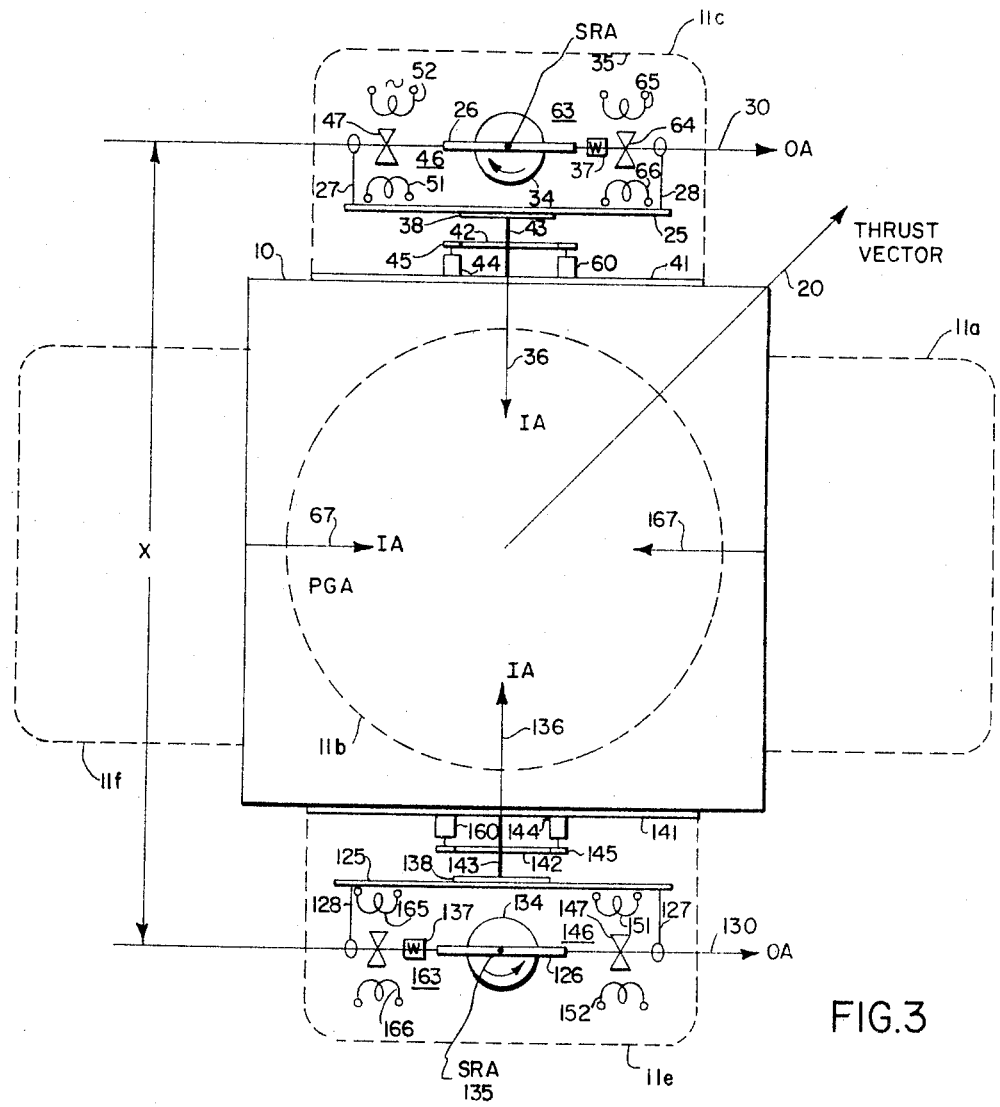
FIGURE 3 is a diagrammatic representation of the system showing in particular the position of two pendulous gyro accelerometers located on the system mounting including the position of the thrust vector with respect to their input axes.

FIGURE 3 shows pendulous gyro accelerometers 11c and 11e opposite each other on mounting block 10 so that their input axes are colinear. Also shown mounted on the block are pendulous gyro accelerometers 11b, 11a, and 11f. Pendulous gyro accelerometer 11d is not shown in FIGURE 3. Accelerometers 11a and 11f are mounted on opposite sides of mounting block 10 with their input axes colinear and perpendicular to the input axes of units 11c and 11e. Accelerometers 11b and 11d also are mounted on opposite sides of mounting block 10 with their input axes colinear and perpendicular to both the common input axes of units 11c-11e and 11a-11f. Pendulous gyro accelerometer 11e is shown in FIGURE 3 in schematic form such as found in FIGURE 4 with the same notations except the reference numerals have 100 added to the reference numerals found in FIGURE 4. The reference numerals for pendulous gyro accelerometer 11c are retained in FIGURE 3 the same as those in FIGURE 4. From examination of FIGURE 3, it may be seen that input axes 36 and 136 are colinear, as are input axes 67 and 167 associated with pendulous gyro accelerometers 11f and 11a respectively. It may be noted that the distance between output axes 30 and 130 is designated as $x$, and it will be further noted from this view that the distance $x$ separates the centroids of the masses 37 and 137 of the two pendulous gyro accelerometers. The thrust vector 20 is also depicted in FIGURE 3. Projected into the plane of the paper of FIGURE 3 it bisects the right angle formed by the intersection of input axes 36–136 and 67–167 of PGAs 11c–11e and 11f–11a, respectively. It will be understood that the thrust vector when projected into the perpendicular plane through 36 and 136 is also at a 45° angle with respect to the input axes of the remaining set of pendulous gyroscope accelerometers 11b and 11d. In this embodiment, the three input axes of each pair of pendulous gyro accelerometers (11a and 11f, 11b and 11d, and 11c and 11e) intersect at one point. Accordingly, all three input axes make equal angles with the thrust vector.

By mounting a pair of pendulous gyro accelerometers so that their input axes are parallel and their gyro momentum wheels are rotated in opposite directions as indicated in FIGURE 3, a basis is provided for separation of the acceleration along the input axes, and angular movement of the platform about the same input axes. This may best be explained by a cursory examination of the type of motions which are sensed by a gimballess platform and were above briefly discussed. In a gimballess system, a vector $dv$, having units of velocity, is determined by measuring its three components along a set of mutually perpendicular body axes. The three components of the vector $dv$, in a space fixed coordinate system which is positioned in a known orientation with respect to the earth, are needed for inertial navigation. The space oriented components of $dv$ can be determined from the body oriented components of $dv$ by knowing the angular motion of the vehicle. The change in angular position of the vehicle during an infinitesimal time interval, $dt$, is designated as $d\theta$. Determination of the orientation of the body axes with respect to the space axes is possible by measuring successive increments of $d\theta$. In a gimballess system, $d\theta$ is determined by three sets of gyros which measure the components of $d\theta$ about the body axes. These body oriented components of $d\theta$ then provide information by which the body oriented components of $dv$ may be transformed into space fixed axes. Since a digital system produces finite quantities, a finite increment $(\Delta)$, instead of the infinitesimal increment $(\alpha)$, will be used in the mathematical representation of the signals produced by in the inertial instruments.

Returning now to FIGURE 3 and the pair of pendulous gyro accelerometers, and assuming further that they are equipped with optical digital pickoffs, the output of the two pickoffs designated as 60 and 160, are in the form of pulse trains. Each pulse train indicates advancement of the pickoff wheel or code plate through a predetermined increment which is generally referred to as the resolution of the pickoff. Means are also provided for determining the sense of the signal, that is whether the wheel is rotating clockwise or counter-clockwise and this will be discussed subsequently. By adding the pulses from the two pickoffs, signals will be obtained which are representative of double the increment of rotation of the pickoffs, and the difference in pendulosity between the two gyros, provided that the turn table of each pair of pendulous gyro accelerometers rotate in opposite directions with respect to each other. In like manner, by subtracting the pulses from the two pickoffs, signals will be obtained which are representative of the integral of the input acceleration only, because the signals representative of the angle through which the turn table is rotated will cancel each other, if the turn tables of each pair of pendulous gyro accelerometers rotate in opposite directions with respect to each other.

There are several ways in which the turn tables of each pendulous gyro accelerometer pair may be made to rotate in opposite directions with respect to each other. One way to cause rotation of the turn table in a particular direction is to have the pendulous quantity of PGA 11c which in FIGURES 3 and 4 are designated by weight 37, appear on the right hand sides as seen looking into the arrowhead of output axis (OA) 30, so that an acceleration directed upward and parallel to the input axis (IA) 36 will cause weight 37 and gimbal 26 to move (rotate) clockwise. Stated otherwise, the application of acceleration along IA 36 causes a reaction on pendulous mass 37 which amounts to a torque acting on gimbal 26 tending to rotate it clockwise about OA 30. The gimbal thus is caused to rotate away from its null signal producing position and accordingly signal generator 46 has an output. Signal generator 46 will supply a signal to servo motor 44 through amplifier 53 and cause the turntable 38 to be rotated in a clockwise direction as seen looking into the input axis (IA) 36. This rotation imparts a precessional torque tending to cause gimbal 26 to rotate counter-clockwise, as seen looking into output axis (OA) 30, because of the clockwise direction of rotation of gyro rotor 34 as seen looking into spin reference axis (SRA) 35. For a steady state acceleration along the input axis 36, a state of equilibrium will be reached at which the inertial reaction torque tending to rotate the gimbal 26 in one sense about the output axis 30 will be opposed by an equal and opposite precessional torque about the output axis 30 acting on the gimbal 26. Thus the gimbal 26 will be deflected or rotated away from its null signal producing position by a certain increment at which position the signal from the signal generating means 46 has a sufficient magnitude that it will cause the turn table 38 to be rotated (by the servomotor means 44) at an angular rate which will cause a gyroscopic precessional torque to be applied to the gimbal 26 equal and opposite to the inertial reaction torque. Thus, as long as the initial accelerational disturbance remains, the turn table will rotate at a constant rate. If the acceleration increases in magnitude, the turn table will rotate faster and conversely if the acceleration decreases, the turn table will rotate at a lesser rate. It will be further understood that for negative accelerations, the turn table 38 will rotate in the opposite direction from that associated with positive acceleration. When the acceleration along the IA 36 goes to zero, then the gimbal 26 will be at its original or null signal producing position and the net angular displacement of the turn table 38 will be an accurate measure of the integral of applied acceleration. In other words the turn table angular position will become a measure of velocity. By following the same reasoning as given above and observing the movements of the various components comprising PGA 11e, it will be observed that an upward acceleration produces the same result as that found for PGA 11c in regards to weight 137, and signal generator 146. However, in order to precess gimbal 126 in the proper direction to null the signal of signal generator 146, the turn table must be rotated in a clockwise direction as seen looking into input axis (IA) 136, but in a counter-clockwise direction as seen looking into input axis (IA) 36. From this description, it will be apparent that when the pendulous mass is changed from one side to the other for a given rotor rotation, the direction must change and that when the direction of rotation of the rotor is changed for a given position of the pendulous mass, the direction of turn table rotation must also change. Where the rotors of each pair of gyros of the pendulous gyro accelerometers are spinning in opposite directions with respect to their pendulosities, the output signals of the pendulous gyro accelerometers will be of the form $$PGA_{11c} = p + \left(\frac{P}{H}\right)_{11c} a_x \quad (1)$$

$$PGA_{11e} = p - \left(\frac{P}{H}\right)_{11e} a_x \quad (2)$$

where $p$ is the angular velocity about the input axis,
$a_x$ is the applied specific force along the input axis, and
$(P/H)$ is the ratio of pendulosity to angular momentum.

Therefore, if the signals represented by Equations 1 and 2 are added and divided by two, the result is that $$\frac{PGA_{11c} + PGA_{11e}}{2} = \frac{2p}{2} + \left[\left(\frac{P}{H}\right)_{11c} - \left(\frac{P}{H}\right)_{11e}\right]\frac{a_x}{2} \quad (3)$$

Subtracting the output signal represented by Equation 2 from the output signal represented by Equation 1 produces a result that yields $$PGA_{11c} - PGA_{11e} = \left[\left(\frac{P}{H}\right)_{11c} + \left(\frac{P}{H}\right)_{11e}\right] a_x \quad (4)$$

From this result it may be seen that a simple pulse separation circuit may be used to separate the pendulous gyro accelerometer outputs into separate angular rate pulses and acceleration pulses. The second term of Equation 3 is analogous to a gyro mass unbalance correction and the term in brackets in Equation 4 is a scale factor to scale the acceleration quantity so it is compatible with the system into which it is to be used. The mass unbalance factor may be removed in a computer which will be connected to the gimballess system. By choosing the proper scale factor for the quantity in brackets of Equation 4, acceleration of the vehicle may be obtained. This may be better illustrated by the block diagram of FIGURE 9 in which a signal from pendulous gyro accelerometer 11c is designated as $\Delta 11_c$ and the signal from pendulous gyro accelerometer 11e is designated as $\Delta 11_e$. The $\Delta 11_c$ signal is applied to an adder 70 through connecting means 71 and the $\Delta 11_e$ signal is applied to adder 70 through a connecting means 72. Simultaneously, a subtractor or subtracting device 73 is excited by the same input signals as adder 70 through a pair of connecting means 74 and 75. The output signal from subtracting device 73 is sent to a pair of multipliers 76 and 77 through a pair of connecting means 80 and 81 respectively. Multiplier 77 multiplies the quantity received on connecting means 81 by a constant $k_v$ and an output is produced on output means 82 which is representative of $\Delta V_1$. Multiplying means 76 multiplies the input signal received on connecting means 80 by a constant $K_\theta$ so that an output signal is sent to a second subtractign means 84 by a connecting means 83. A dividing means 85 is connected to adder 70 by a connecting lead 86. Dividing means 85 divides the input quantity by two and produces an output which is connected to subtracting means 84 through a connecting means 87 so that the output from subtracting means 84 is representative of $\Delta\theta_1$ and appears on an output lead 88. In other words the input signals $\Delta 11_c$, and $\Delta 11e$ are added to produce a summation signal as represented by Equation 3, and signal $\Delta 11e$ is subtracted from signal $\Delta 11c$ to produce a difference signal as represented by Equation 4, where the difference signal represented by Equation 4 is multiplied by a constant $K_\theta$, and where the summation signal is divided by two so that the difference signal multiplied by constant $K_\theta$ is subtracted from the summation signal which is divided by two, to produce an ultimate signal representative of the quantity $\Delta\theta_1$. This may be verified where $p_{11c} = p_{11e}$ such as would be found in a pair of substantially identical pendulous gyro accelerometers and where $$K_\theta = \left[\frac{\left(\frac{P}{H}\right)_{11c} - \left(\frac{P}{H}\right)_{11e}}{\left(\frac{P}{H}\right)_{11c} + \left(\frac{P}{H}\right)_{11e}}\right]\frac{1}{2}$$

Figure 9:
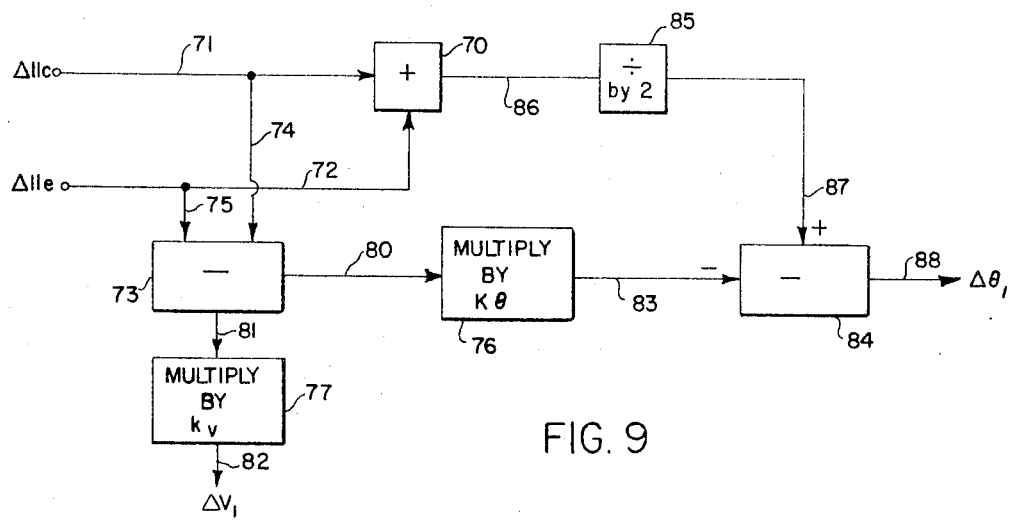
FIGURE 9 is a more detailed diagram of FIGURE 8 showing the steps performed by the separation circuit.

In this type of operation, adder 70 performs the additions required in Equation 3, divider 85 reduces the result by the factor of 2, differencing means 73 performs the subtracting operation required by Equation 4, and finally differencing means 84 substracts the quantity represented by Equation 4 which is multiplied by the proper scale factor $K_0$, from the quantity represented by Equation 3. In order to obtain a quantity representative of acceleration, or $\Delta V_1$ it is necessary to let $$k_v = \frac{1}{\left(\frac{P}{H}\right)_{11c} + \left(\frac{P}{H}\right)_{11e}}$$

and multiply Equation 4 by this quantity as shown in FIGURE 9 by multiplier 77.

Therefore the quantity $\Delta V_1$ is=to $a_x$, or the acceleration sensed by the pendulous gyro accelerometer.

The scheme just mentioned for deriving signals representative of $\Delta V_1$ and $\Delta \theta_1$ appears to be flawless except for one possible factor known in the gyro art as "separation error." Since the pendulous masses of the two pendulous gyro accelerometers in each pair are not coincident, they do not measure the same acceleration since they are at a different radius from an instant center. The separation error creates an error in the output signals of the accelerometers so that when the signals are broken up into components, or separated, as represented by Equations 3 and 4, the separation error will appear in each equation. In other words, in one instance the separation error shows up in the signals representative of acceleration of the vehicle and in a second instance it shows up in the signals representative of the rotation of the vehicle about some instant center. If the two pendulous gyro accelerometer input axes are colinear, and the pendulous masses are separted by a distance $x$, the outputs of pendulous gyro accelerometer $11_c$ and $11_e$ are as follows:

$$PGA_{11c} = p + \left(\frac{P}{H}\right)_{11c}[a_x + \tfrac{1}{2}x(q^2+r^2)] \quad (5)$$

$$PGA_{11e} = p - \left(\frac{P}{H}\right)_{11e}[a_x - \tfrac{1}{2}x(q^2+r^2)] \quad (6)$$

where
$q$ is equal to an angular velocity perpendicular to the input axis 36 and 136 of PGA $11c$ and PGA $11e$; and
$r$=the angular velocity which is perpendicular to the plane created by $q$ and $p$.

By manipulations of this formula through the same steps as that previously described, it will be found that two extra terms emerge, one of which will result from summing the quantities and the other from subtracting the quantities. The centrifugal error term which will result in the difference signal (representative of acceleration), may be dropped since it is negligible, however, the centrifugal error term which will appear with the summation process, (representative of rotation) is significant and since it is possible to calculate this quantity, it may be removed in the computer.

Other important errors associated with pendulous gyro accelerometers in a gimballess inertial platform are eliminated by positioning the input axes at equal angles to the thrust vector as described previously in the specification. These errors are generally well known to those skilled in the gyro art and may be described as follows:

(1) Mass unbalance (Displacement of the center of the pendulous mass from the gyro spin axis)
(2) Anisoelasticity
(3) Linear cross coupling
(4) Angular cross coupling
(5) Cylindrical torque
(6) Angular velocity about the gyro output axis
(7) Gyro pick-off null shift
(8) Angular velocity about spin axis causing change in spin motor speed.

Errors 2 through 5 are so called "product effects" because they depend upon the product of accelerations or angular velocities about the input and spin axes. These product effects cause errors of two types, those due to large static values of the input motion, and those due to vibratory motion. Errors due to vibratory motion occur because the product of two vibrations, each having a zero mean, can have a non-zero mean. In certain applications, the vibratory errors are by far the most important. If the turntable of the pendulous gyro accelerometer (PGA) rotates at a constant angular velocity, the mean value of the magnitude of the component of motion along the spin axis oscillates about a mean value of zero. This causes the error effects enumerated in items 1 through 8 to have a mean value of zero over each complete revolution of the gyro. The effect of rotation of the PGA is thus to reduce each error effect from a unidirectional gyro drift or acceleration error, to an oscillatory error with a zero mean. If the period of gyro rotation is small compared to the Schuler period, the input error will be of no consequence in its effect upon position error because the Schuler loop acts as a filter having an attenuation to high frequency inputs of twelve decibels per octave. For example if the gyro turntable makes 50 revolutions in a Schuler period, the input error will be attenuated by a factor of approximately 2500 in its effect upon position error. As explained earlier this attenuation is attained by orienting the three mutually perpendicular input axes so that they make approximately equal angles with respect to the resultant applied force vector thereby causing rotation of the turn table. The effect of angular velocity about the gyro output axis is to cause a gyro torque in such a direction that the output axis pivot may be forced into the jewel which restrains it. This causes increased stiction (friction between the pivot and jewel), and hence increased drift. By rotating the gyro turn table as used in the gimballess system, the errors which were enumerated will be substantially reduced to a zero value.

The prior portion of the specification assumed that the components on the mounting block 10 were prefectly aligned and it is generally known to those skilled in the art that when a misalignment occurs, a compensation will be required to compensate the inertial instruments such as pendulous gyro accelerometers $11a$ through $11f$ for misalignment on mounting block 10. By misalignment, it is meant that the input axes of the inertial instruments do not lie along the assumed input axes which form the components of an orthogonal coordinate system. Remembering that there are three pairs of inertial instruments, one pair will now be discussed further where an initial alignment error has been introduced. From the teaching which follows, it will be seen that there are advantages for some applications, in using three pendulous gyro accelerometers and three single axis platforms. For purposes of illustration, let it be assumed that a pendulous gyro accelerometer yielding the output $PGA_1$ is in alignment with the required input axis and that a second pendulous gyro accelerometer yielding the output $PGA_2$ is misaligned with the first accelerometer by the angle $\delta$.

It may be shown by neglecting certain small terms, in determining the amount of rotation of the turn tables, such as turn tables 38 and 138, that the signal outputs will be representative of $$\frac{PGA_1 + PGA_2}{2} = p + q\frac{\delta}{2} + \frac{ax}{2}\left[\left(\frac{P}{H}\right)_1 + \left(\frac{P}{H}\right)_2\right] +$$
$$\tfrac{1}{2}\left[\left(\frac{P}{H}\right)_1 - \left(\frac{P}{H}\right)_2\right]\tfrac{x}{2}(q^2+r^2) + \left(\frac{P}{H}\right)_2\frac{ay\delta}{2}$$

(5)

where $ax$ is the acceleration produced by a force parallel to the input axes IA, and
$ay$ is the acceleration produced by a force perpendicular to the input axis IA.

Figure 6:
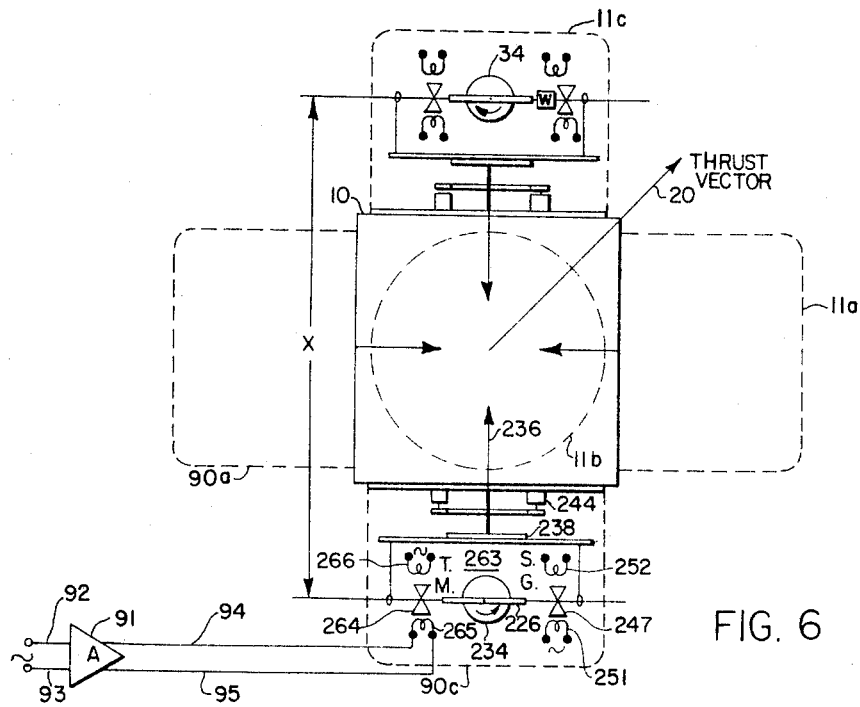
FIGURE 6 is a diagrammatic drawing similar to FIGURE 3 except employing a single axis platform and a pendulous gyro accelerometer.

The term of significance in the equation is the last term which is the misalignment term that will have to be presented as a signal to the computer associated with this gimballess system in order to correct the error. However, if the output from a pendulous gyro accelerometer is used for $PGA_1$ and the output from a single axis platform is used in place of $PGA_2$, then this last term will be substantially zero since the quantity $(P/H)$ is relatively small, and and when multiplied by a small angle, would be a negligible quantity in comparison to the other components of the signal represented by the other quantities of the equation. Thus, referring to FIGURE 6, there may be found a pendulous gyro accelerometer such as that described and shown in FIGURE 4, and a single axis platform (SAP) which is similar to the pendulous gyro accelerometer 24 as shown in FIGURE 4 with the exception that the pendulous mass or weight 37 and its lever arm has been removed. In other words, the configuration of FIGURE 6 is such that it will contain pendulous gyro accelerometers 11a, 11b, and 11c and will contain single axis platforms 90a, 90b, and 90c opposite the respective pendulous gyro accelerometers. For example (as shown in FIGURE 6) PGA 11c and SAP 90c are mounted on opposite sides of the mounting block and have colinear input axes, reference numeral 236 identifying the IA of SAP 90c. The single axis platform has a rotor which may be rotated in either direction with respect to the pendulous gyro accelerometer. In order to avoid repetition, the single axis platform may be identified by reading the description of the pendulous gyro accelerometer and adding 200 to the designation of pendulous gyro accelerometer numerals and omitting any reference to the accelerations of mass 37 or rotation of turn table 38 caused by such accelerations. While the additional components are not designated by reference numerals, the important feature of the single axis platforms used in the present invention is that the gimbal of the gyro mounted on the turn table must be torqued at a constant rate in order to produce rotation of turn table 238. Since the gyro gimbal of the gyro mounted on the single axis platform does not contain a deliberate pendulosity component, means are provided in order to cause rotation of the turn table since elimination of the errors enumerated earlier in the specification are dependent upon rotation of the turn table. It will be remembered that this was achieved by allowing the input axes of the pendulous gyro accelerometers to form approximately equal angles with the thrust vector 20. In order to torque the gyro gimbal about its output axis a torque motor 263 is utilized which contains an excitation winding 266, a control winding 265 and a rotor 264. Rotor 264 is attached to gimbal assembly 226 in order to cause gimbal 226 to be rotated about its output axis by torque motor 263 when control winding 265 is energized. In other words as long as a torque is created in torque motor 263, turn table 238 of single axis platform 90c will be rotated. This rotation is accomplished by supplying an alternating voltage to a constant current or voltage device 91 which may be in the form of a constant current amplifier that is excited by an alternating voltage source through a pair of connecting leads 92 and 93. Amplifier 91 is connected to the two terminals of control winding 265 by a pair of connecting leads 94 and 95. The constant current signal supplied by amplifier 91 causes control winding 265 to set up a field so that rotor 264 is urged into rotation. The slight rotation of rotor 264 deflects gimbal 226 which in turn causes a signal to be generated in the signal generator means control winding 252. This signal is then amplified and applied to servo 244 which rotates turn table 238. Thus the signal generator means is responsive to motions sensed by the single axis platform and responsive to the constant predetermined force applied by torque motor 263 as a result of the signal from amplifier 91. The operation of the device then would be the same as that previously described with the exception that the alignment term $$\left(\frac{P}{H}\right)_2 \frac{ay\delta}{2}$$

would not be present. However, by causing the turn table to rotate at a particular rate of rotation, a signal representative of this rate of rotation will have to be supplied to the computer which will be used in conjunction with the system, so that the signal representative of this rate of rotation may be subtracted immediately from the output signal $\Delta\theta_1$, which will contain the constant rate signal. The rate of rotation will be determined by the particular application for which the device is to be used and it must be realized that there are certain limits which are determined by the physical relationships of the single axis platform itself. In other words there is a range of values in which the single axis platform can perform satisfactorily and it is most likely that this range of rotational values would be between 0.005 radians per second and 0.05 radians per second. However, it must be remembered that the particular application may alter either of these values.

Figure 10:
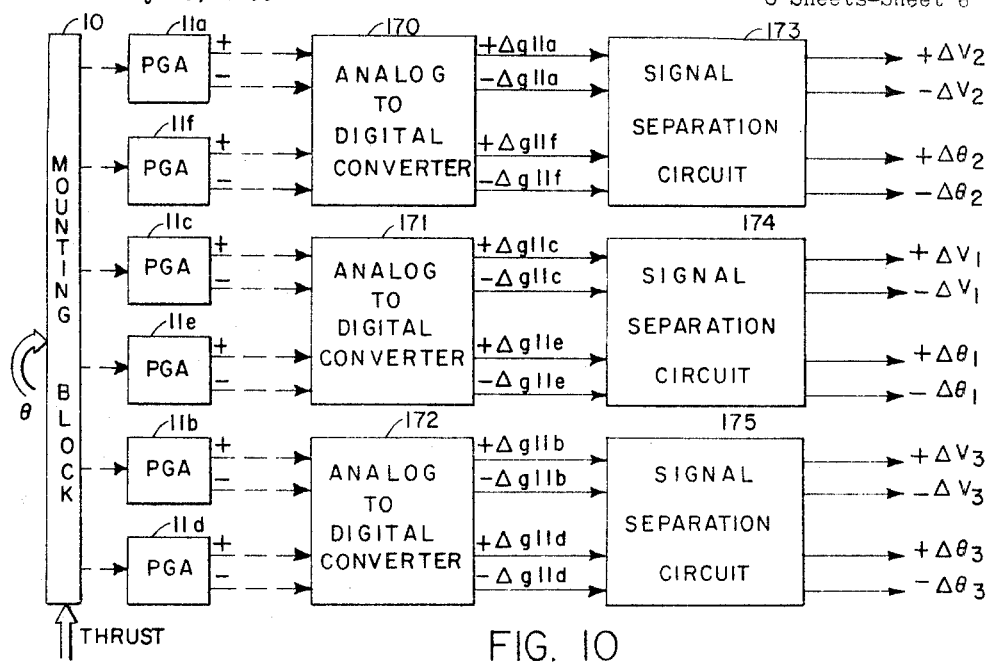
FIGURE 10 is a block diagram of the gimballess system utilizing six pendulous gyro accelerometers and their associated circuits.

In using a code wheel attached to the turn tables such as 38, 138, and 238 of the pendulous gyro accelerometers or single axis platforms, it was previously stated that the Aske and Glick co-pending application, now Patent No. 3,041,883, would provide the desired results. In order to transform the light pulses into pulses of usable electrical energy, it is necessary to provide suitable means such as a pair of photoelectric cells, and the associated circuits which are generally of the pulse gate type circuits. The patent of W. W. Beman et al. 2,685,082 issued January 27, 1954, shows such a device in FIGURE 11. By using only the portion of FIGURE 11 associated with the photoelectric cells, amplifiers, triggers, and gates, the proper pulses may be produced which will emerge on a pair of connecting leads 96 and 97 as found in FIGURE 7 herein. These two leads correspond to terminals 36 and 37 of the Beman patent. A pair of photocells 100 and 101 are connected to a pair of amplifiers 102 and 103 by a pair of connecting leads 104 and 105 respectively. Amplifiers 102 and 103 may be of any suitable type producing a sufficient amplification and the signals emerging from amplifier 102 are used to energize a Schmitt trigger circuit 106 through a connecting lead 107 and the signals from amplifier 103 are used to energize a second Schmitt trigger circuit 108 through a connecting lead 109. The Schmitt trigger circuit is well known to those skilled in the art and will not be discussed at this time. One side of Schmitt trigger circuit 106 is connected to a pair of gates 110 and 111 through a pair of connecting leads 112 and 113 respectively. The other side of Schmitt trigger circuit 106 is connected to another pair of gates 114 and 115 by a pair of connecting leads 116 and 117 respectively. Gates 110, 111, 114 and 115 are of the type described and shown in Figure 10.16 page 379 of "Wave Forms," vol. 19 of the Radiation Lab. Series of Mass. Institute of Technology. Schmitt trigger circuit 108 has one side connected to gate 114 through a connecting lead 118, and gate 110 is connected to the same side of Schmitt trigger circuit 108 through a connecting lead 119. The other side of Schmitt trigger circuit 108 is connected to gate 115 through a connecting lead 120 and is further connected to gate 111 through a connecting lead 121. The output of gate 110 emerges on output lead 96, and the output of gate 115 is connected to output lead 96 through a connecting lead 122. The output of gate 114 is connected to output lead 97 and the output of gate 111 is connected to output lead 97 through a connecting lead 123. The circuit as shown thus provides positive direction of rotation pulses on output lead 96 and negative direction of rotation pulses on output lead 97. Pulses as referred to here, may all be thought of as positive going pulses. However, the pulses (depending upon which output line they are on) represent a different direction of rotation of the code wheel as found in the previously mentioned Aske and Glick co-pending application. In considering the operation of the circuit, gates 110, 111, 114 and 115 respond to positive pulses only. Because of the direction in which the code disc will be rotating, it is apparent that the light as seen by one photo-cell will lead the light as seen by the other photo-cell. However, if the direction of rotation of the code disc is reversed then, the photo-cell which saw a pulse of light first, will now see the pulse of light second. Bearing this in mind, it is possible to use photo-cell 100 as a means of counting the number of slits in the disc which move past it, and to use photo-cell 101 to determine the direction in which the disc is moving. By allowing the code disc to rotate in a given direction that will tend to produce negative going signals on line 116 designated as $k$ and line 118 designated as $n$, gates 114, 115, and 110 would be cut off and will not pass any signal. During this interval of time, a positive going pulse would be present on line 120 designated as $m$ and line 113 designated as $j$. Positive going pulses would then appear on gates 110, 111, and 115 so it follows that the only gate which will conduct is gate 111 because it has 2 positive inputs, so that a negative going pulse is produced on output lead 97. While the disc is still rotating in the same direction the negative going pulse may be found on terminals $k$ and $m$ thereby blocking gates 114, 111, and 115. Positive going pulses will then appear at terminals $n$ and $j$, thereby placing positive pulses on gates 110, 114, and 111, to allow gate 110 to conduct because it has 2 positive inputs and pass a positive going pulse on line 96. During this period of operation, line 97 will provide the direction control of the circuits which are yet to be described.

When the code wheel is reversed and rotates in a direction opposite to that just described, negative going pulses may appear on terminals $k$ and $m$, thereby blocking gates 111, 114, and 115. Positive going pulses will appear on terminals $j$ and $n$ and allow a positive pulse to proceed through gate 110 and produce a positive going pulse on line 96. In a second instance, a negative going pulse may be found on $k$ and $n$ and gates 110, 114 and 115 are blocked, but positive going pulses will be found on terminals $m$ and $j$ and allow gate 111 to produce a negative going pulse on line 97. While rotating in this direction, the direction control is maintained by line 96. A more complete and detailed description of this device may be obtained by referring to the Beman et al. Patent 2,685,082, but since the details of operation do not form a part of the present invention it does not appear necessary to go into a further discussion of these details.

Figure 8:
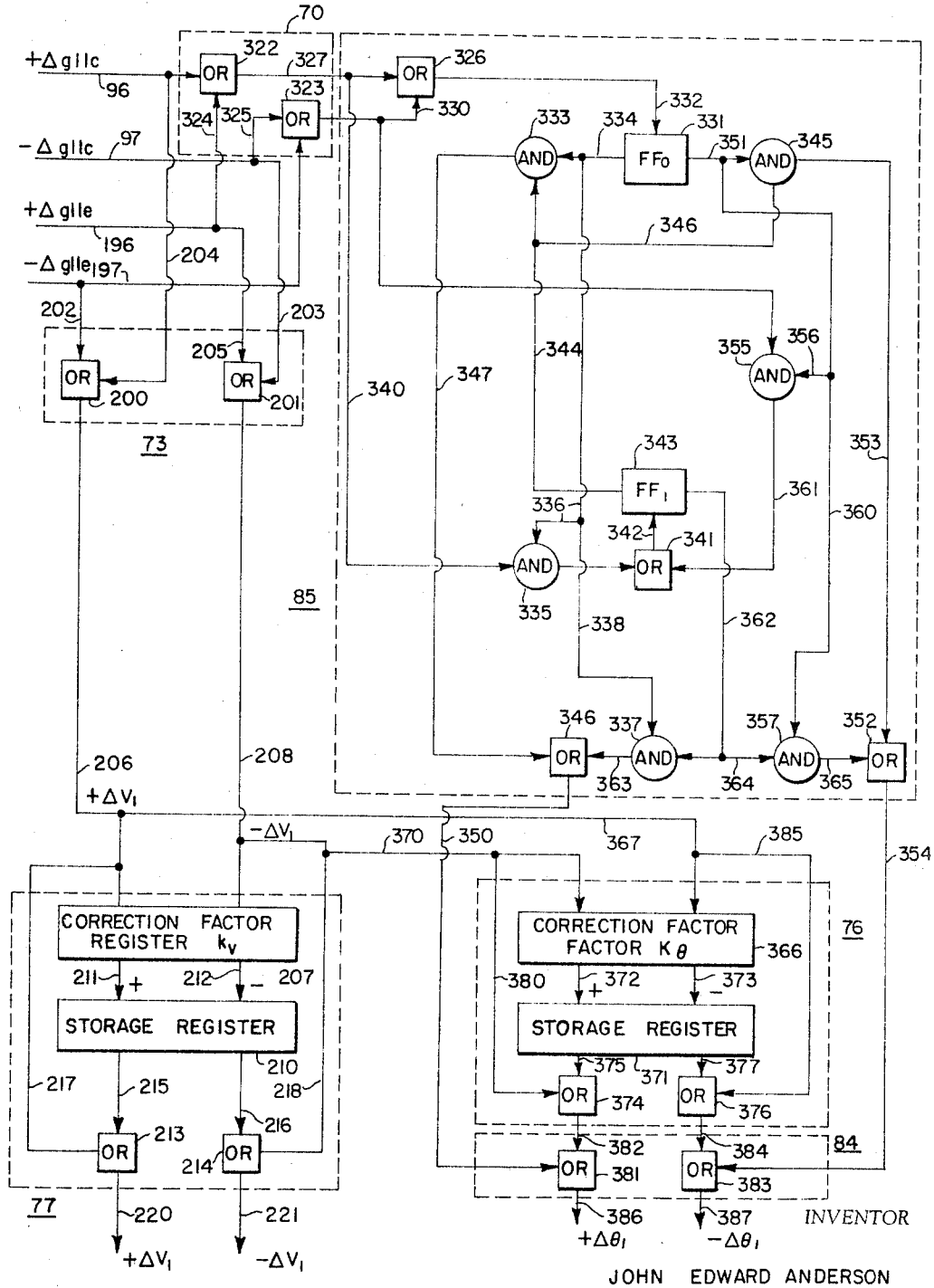
FIGURE 8 is a diagram of a circuit for separating the digital error signals received from the rotational turntables into components.

FIGURE 8 is a more detailed drawing of the block diagram as shown in FIGURE 9 and from this drawing it will be seen that the positive direction of rotation pulses indicating motion of a turn table within a gyroscopic instrument such as a pendulous gyro accelerometer 11c are received on lead 96 and the negative direction of rotation pulses are received on lead 97. It should also be kept in mind that the gyroscopic instrument may be a single axis platform. However, there is no difference in the manner in which the output signals are received from either, and therefore the description of the separation circuits which follow will apply to the embodiment employing six pendulous gyro accelerometers, or three pendulous gyro accelerometers and three single axis platforms. In like manner, pendulous gyro accelerometer 11e produces signals which are indicative of positive or negative rotation and these signals are received on a pair of connecting leads 196 and 197. It will be remembered that in order to obtain the quantities of acceleration, or $\Delta V_1$, and rotational rate $\Delta \theta_1$, it is necessary to separate these quantities as shown in the block diagram of FIGURE 9. Subtracting device 73 contains a pair of OR gates 200 and 201 where OR gate 200 is connected to lead 197 by connecting lead 202, and OR gate 201 receives a negative pulse from connecting lead 97 through a connecting lead 203. OR gate 200 receives a positive pulse from lead 96 through a connecting lead 204 and OR gate 201 receives a positive pulse from connecting lead 196 through a connecting lead 205. OR gates 200 and 201 and those which are to be described are generally known to those skilled in the art. A typical OR gate is shown in FIGURE 4–3 of Chapter 4 of "Notes on Analog-Digital Conversion Techniques" edited by Alfred K. Susskind, the Technology Press, 1957, Mass. Institute of Technology. Since any positive pulse will be transmitted from OR gate 200 or 201, correction factor multiplier 77 will receive the output of OR gate 200 through a connecting lead 206 which is connected to a correction factor register 207, containing correction factor $k_v$. Correction factor register 207 also receives a negative going pulse from OR gate 201 through a connecting lead 208. Correction factor register 207 is connected to a second storage register 210 through a connecting lead 211 which supplies positive pulses and a connecting lead 212 which carries negative pulses. Depending on which pulses are received into correction factor register 207, storage register 210 will produce a pulse which will be added to, or subtracted from, the condition existing in a pair of OR gates 213 and 214. This is accomplished by connecting OR gate 213 to storage registers 210 through a connecting lead 215 and connecting OR gate 214 to storage register 210 through a connecting lead 216. OR gate 213 is also connected to line 206 and OR gate 214 is connected to line 208 by a pair of connecting leads 217 and 218 respectively. The outputs from OR gates 213 and 214 emerge on a pair of connecting leads 220 and 221 to supply signal pulses representative of plus $\Delta V_1$ and minus $\Delta V_1$ respectively.

Summation device 70 contains a pair of OR gates 322 and 323. OR gate 322 is connected to lead 96 and to connecting lead 196 through a lead 324. OR gate 323 is connected to lead 197 and to lead 97 through a connecting lead 325. Thus a positive pulse is produced on the output of OR gate 322 which is sent to an OR gate 326 of dividing means 85 through a connecting lead 327. OR gate 326 is also connected to OR gate 323 through a connecting lead 330. Dividing means 85 is a two stage reversible counter and one form of a reversible counter is shown and described in the Susskind text, mentioned previously, on page 4–26 which is Figure 4–21 entitled, "Reversible Binary Counter." A trigger pulse is received at a flip-flop 331 through a connecting lead 332, however it will be assumed that flip-flop 331 is in a neutral state and is actuated so that the left hand member conducts and sends a pulse to an AND circuit 333 through a connecting lead 334. Since there is no other pulse on AND circuit 333 there is no output. The pulse on lead 334 is sent to an AND circuit 335 through a connecting lead 336 and is further connected to an AND circuit 337 through a connecting lead 338. It will be assumed that a previous pulse was received at AND circuit 335 through a connecting lead 340 which is also connected to lead 327. The output of AND circuit 335 is sent to an OR gate 341 to produce an output upon a connecting lead 342 and cause a second flip-flop 343 to be driven into a condition of operation. It will be assumed that the left hand side of flip-flop 343 conducts, so that a pulse is then set to AND circuit 333 through a connecting lead 344 and to another AND circuit 345 through a connecting lead 346. Since there is no other pulse on AND circuit 345, there is no output pulse produced, however, AND circuit 333 has received a pair of input pulses and therefore produces an output pulse which appears at an OR circuit 346 through a connecting lead 347. The output pulse from OR circuit 346 can then emerge on an ouput lead 350. Its other connection will be determined later. Assuming now that a second pulse is transmitted on lead 332, flip-flop 331 will assume the other mode of operation in which the right hand side produces a pulse and the left hand side remains cut off so that AND circuit 345 receives a pulse through a connecting lead 351. AND circuit 345 then produces an output which is sent to an OR circuit 352 through a connecting lead 353 so that an output pulse is produced from OR circuit 352 which emerges on a lead 354. At the same time the output pulse appearing on lead 351 is sent to an AND circuit 355 through a connecting lead 356, another AND gate 357 is connected to lead 351 through a connecting lead 360. Thus there appears on AND circuit 355 an output which is sent to OR gate 341 through a connecting lead 361 and hence through lead 342 to change the output of flip-flop 343 to the opposite mode of operation so that the right hand side is conducting and produces a pulse which is sent to AND gate 357, from connecting lead 362 and a connecting lead 364, so that an output pulse is produced on a connecting lead 365 which is connected to OR gate 352. Thus there appears an output pulse on connecting lead 354 which is connected to the output of OR gate 352. It may be seen that this process may be reversed and the two stage reversible counter will thus produce a pulse for every other input pulse since there are positive and negative pulses coming from two different pendulous gyro accelerometers. In other words, in order to keep track of the rotation of the code disc, where two separate discs are producing pulses a division by two must take place to get a true value of the rotation. Another correction multiplier 76 contains a correction factor register 366 which is used to correct the inputs by the quantity $K_0$ which was earlier defined in the specification. Correction Factor Registers 207 and 366, as well as Storage Registers 210 and 271, may be of the common Delay Line register or the Shifting Register type. One common type of Shifting Register is shown on page 299, Figure 13–25 of "High-Speed Computing Devices" by Engineering Research Associates, First Edition, Third Impression, 1950. Correction factor register 366 receives a pair of input pulses from connecting lead 206, through a connecting lead 367, and receives negative pulses from connecting lead 208, through a connecting lead 370. Correction factor register 366 is connected to a storage register 371 through a pair of connecting leads 372 and 373 which produced positive and negative pulses respectively. These two storage registers are of the same type as storage registers 207 and 210. The output of storage register 371 is connected to an OR gate 374, through a connecting lead 375, and is connected to a second OR gate 376 through a connecting lead 377. Positive pulses are produced from OR gate 374 and these are combined with pulses received on lead 370, through a connecting lead 380, so that the outputs are sent to an OR gate 381 through a connecting lead 382. OR gate 381 is part of subtracting means 84 which is used to subtract the velocity terms from the rotational terms. In like manner, a second OR gate 383 is energized from OR gate 376 through a connecting lead 384, OR gate 376 receives positive input pulses from connecting lead 367 through a lead 385. Thus the output of $+\Delta\theta_1$ is produced on an output lead 386, which is connected to OR gate 381 and a $-\Delta\theta_1$ is produced on a connecting lead 387 which is connected to OR gate 383. The output on lead 215 from storage register 210 has the effect of changing all "ones" to all "zeros" and the output received on connecting lead 216 has the effect of changing all "zeros" to all "ones." The same result is obtained in like manner with respect to output leads 375 and 377 respectively. A brief description of the operation can best be seen by referring to FIGURE 10 for the first embodiment of the invention employing six pendulous gyro accelerometers. The mounting block 10 receives the thrust generated by the vehicle or dirigible craft and any rotational acceleration imparted to the craft and these quantities are transmitted to the six pendulous gyro accelerometers mounted on mounting block 10. Pendulous gyro accelerometers 11a and 11f, which are mounted oppositely each other, apply their signals to an analog to digital convertor 170 (shown in FIGURE 7) which changes the signals from a shaft rotation to a digital pulse output. Positive and negative output pulses from analog to digital convertor 170, representative of the rotation of the platform of the pendulous gyro accelerometers 11a and 11f are applied to a signal separation circuit 173 (shown in FIGURE 8). Signal separation circuit 173 separates the signals representative of acceleration terms from the rotational terms and the signals which emerge from signal separation circuit 173 are representative of first components of the total velocity of the craft and the angle through which the aircraft has rotated about an instant center. In like manner, pendulous gyro accelerometers 11c and 11e apply their output signals to an analog to digital convertor 171 where the signals are changed into pulse signals. The pulse signals are applied to a signal separation circuit 174 where they are separated into second components representative of velocity of the craft, and rotation of the craft about an instant center. To complete the operation, signals are obtained from pendulous gyro accelerometers 11b and 11d which are applied to an analog to digital converter 172 where the signals are changed into pulse signals and the pulse signals are applied to a signal separation circuit 175. Third components of the velocity and rotation of the craft about an instant center are generated in signal separation circuit 175 and brought out as output signals. Thus output signals are obtained that are positive and negative pulse signals representative of each component of velocity of the craft and positive and negative pulse signals representative of each component of rotation of the dirigible craft about an instant center, and these signals are represented by symbols of $\Delta V$ and $\Delta \theta$ respectively.

Figure 11:
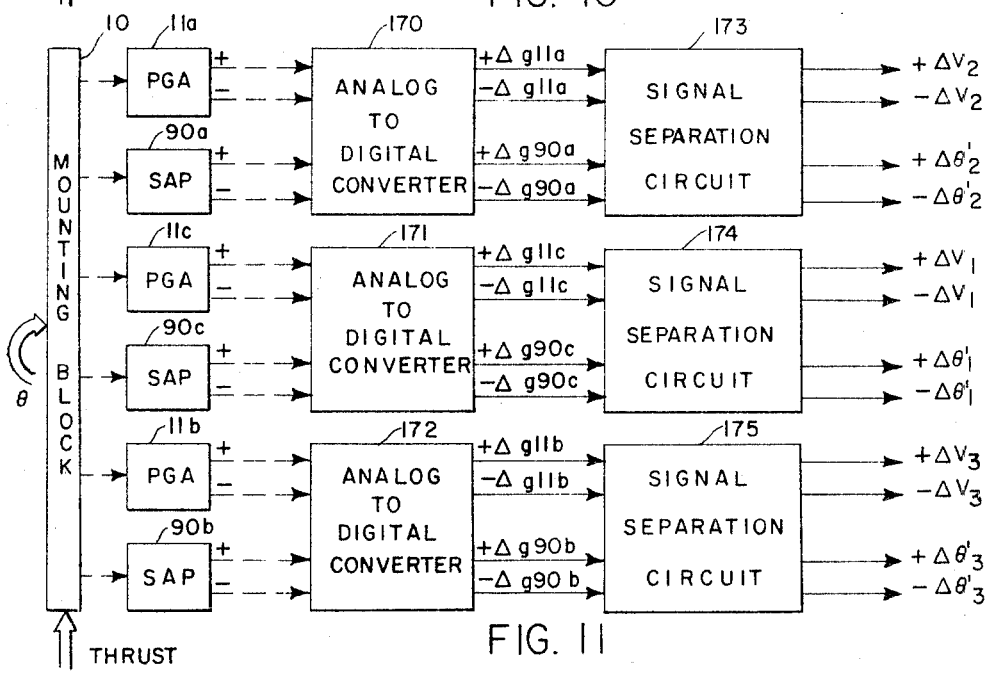
FIGURE 11 is a block diagram of the gimballess systems utilizing three pendulous gyro accelerometers and three single axis platforms along with their associated circuits.

FIGURE 11 shows the second embodiment of the invention which contains three pendulous gyro accelerometers and three single axis platforms. In operation, this embodiment of the invention receives the thrust created by the craft and it is applied through mounting block 10 to the three pendulous gyro accelerometers and three single axis platforms which are mounted thereon. Since the thrust applied to each pendulous gyro accelerometers is substantially the same, the turn tables of pendulous gyro accelerometers 11a, 11c, and 11b are caused to rotate due to the pendulosity of the gimbals and they each produce output signals which are a series of pulses. The three single axis platforms 90a, 90c, and 90b are not substantially affected by the thrust applied to mounting block 10; however, their turn tables are driven by a constant torque producing device so that they rotate at a predetermined rate and thereby reduce the errors enumerated previously in the specification. It must be kept in mind that this constant rotation is subject to be increased or decreased by the value of rotation of the dirigible craft with respect to an instant center. The signals emerging from pendulous gyro accelerometer 11a and single axis platform 90a are applied to analog to digital converter 170 which changes the shaft rotation signal into a series of pulses and these pulses are applied to signal separation circuit 173 where they are separated into components of velocity of the vehicle and rotation of the vehicle. It should be borne in mind that the rotation quantity contains the constant rotation signal which was applied to the single axis platform, and therefore this constant rotational signal must be subtracted from the total rotational signal. It is for this reason, that the angle $\theta$ has been designated as $\theta'$ to show that $\theta'$ includes the constant rotational signal. In like manner, pendulous gyro accelerometer 11c and single axis platform 90c apply their signals to analog to digital convertor 171 where the signals respresentative of a shaft position are changed to pulses and the pulse signals are applied to signal separation circuit 174. Signal separation circuit 174 separates the received signals into second components of velocity of the vehicle and the angle through which the dirigible craft has rotated about an instant center. In like manner, pendulous gyro accelerometer 11b and single axis platform 90b apply their shaft rotational signals to analog to digital converter 172 where the signals are transformed into pulses which are applied to signal separation circuit 175. Signal separation circuit 175 separates the signals into third components of velocity of the dirigible craft and rotation of the dirigible craft about an instant center.

Thus it may be seen that there are several ways in which to obtain signals representative of the velocity of the dirigible craft and the angle through which the dirigible craft has rotated about some instant center. By using an appropriate computer, these signals may be combined to obtain signals representative of the velocity of the craft and the angle through which the craft is rotated with respect to some instant center.

While I have shown and described a preferred embodiment of this invention, the invention should not be limited to the particular form shown, and I intend in the appended claims to cover all modifications which do not depart from the spirit and scope of the invention.

I claim:

1. An inertial reference system for a dirigible craft comprising: mounting means having a plurality of mounting surfaces and also including attachment means for attaching said mounting means to a dirigible craft; means including a plurality of inertial instruments for sensing motion, each of said instruments having an input axis and a turn table adapted to be rotated about said input axis; means for attaching each of said instruments respectively to one of said mounting surfaces of said mounting means so that the input axes of said instruments form substantially equal angles with respect to a reference vector and so that said input axes intersect; means connected to said instruments and adapted to cause rotation of said inertial instrument turn tables; means attached to said plurality of inertial instruments and responsive to rotation of said turn tables to provide digital output signals; and digital signal separation means responsive to said output signals from said latter named means for separating said output signals into digital components.

2. An inertial reference system for a dirigible vehicle comprising: mounting means; means including a plurality of inertial instruments for sensing rotational movement and linear acceleration, each of said instruments having a turn table adapted to be rotated about a rotational axis; means for attaching said instruments to said mounting means so that the rotational axes of said instruments intersect and form substantially equal angles with respect to a reference vector; means connected to said instruments and responsive to forces external to said inertial instruments and adapted to cause rotation of said inertial instrument turn tables about their rotational axes; pickoff means connected to said mounting means and responsive to rotation of said platforms to provide output signals; and signal separation means responsive to said output signals from said pickoff means for separating said output signals into components.

3. An inertial reference system for a dirigible craft comprising: mounting means having six mounting surfaces, adjacent ones of which are mutually perpendicular; inertial instrument means including three pendulous gyro accelerometers and three single axis platforms for sensing movement, said instruments having turn tables adapted to be rotated about their rotational axes; means for attaching each of said pendulous gyro accelerometers and said single axis platforms respectively to one of said surfaces of said mounting means so that said rotational axes substantially intersect and so that each accelerometer is mounted on a surface which is parallel to a surface upon which is mounted a single axis platform; means responsive to motions sensed by said pendulous gyro accelerometers and adapted to cause rotation of the turn tables of said pendulous gyro accelerometers; means responsive to motions sensed by said single axis platforms and responsive to a constant force, said means responsive to motions being adapted to cause rotation of the turn tables of said single axis platforms; pickoff means responsive to rotation of said turn tables to provide output signals; and signal separation means responsive to said output signals from said pickoff means for separating said output signals into components.

4. An inertial reference system for a dirigible craft comprising: means including a plurality of inertial instruments for sensing motions, said instruments having turn tables adapted to be rotated about their rotational axes; mounting means for mounting said plurality of inertial instruments so that said rotational axes intersect and so that said rotational axes form substantially equal angles with respect to a reference vector; means responsive to forces external to said inertial instruments and adapted to cause rotation of the turn tables of said inertial instruments about said rotational axes; digital means responsive to rotation of said turn tables to provide output signals; and signal separator means connected to said digital means and responsive to said output signals, said signal separator means separating said digital output signals into components.

References Cited by the Examiner

UNITED STATES PATENTS

| | | |
|---|---|---|
| 2,752,792 | 7/1956 | Draper et al. |
| 2,933,267 | 4/1960 | Slater et al. |
| 3,049,294 | 8/1962 | Newell. |
| 3,050,995 | 8/1962 | Dozier _____ 33—226 X |
| 3,087,333 | 4/1963 | Newell. |
| 3,164,340 | 1/1965 | Slater et al. _____ 33—226 X |
| 3,193,216 | 7/1965 | Fischel. |
| 3,194,948 | 7/1965 | Alexander et al. |

ROBERT B. HULL, *Primary Examiner.*

ARTHUR M. HORTON, BENJAMIN A. BORCHELT, W. J. CURRAN, *Examiners.*